United States Patent Office 3,081,180
Patented Mar. 12, 1963

3,081,180
METHOD OF PREPARING GLASS BATCH INGREDIENTS
Stanley Krinov, Wadsworth, Ohio, assignor, by mesne assignments, to Pittsburgh Plate Glass Company
No Drawing. Filed July 22, 1959, Ser. No. 828,697
12 Claims. (Cl. 106—52)

The present invention relates to the manufacture of glass. More particularly, the present invention relates to improvements in the preparation, mixing and handling of batches of glass making ingredients.

In the manufacture of glass, many problems are encountered during the mixing and melting operations that seriously interfere with the efficiency and economy of the overall glass making operation. Thus, considerable carryover of dust from melting furnaces is one particularly bothersome problem encountered which may require the employment of extensive dust trapping and collection equipment on furnace flues. Another associated problem concerns the occurrence of considerable internal dusting in the melting furnaces employed. Internal furnace dust contains alkali ingredients of the glass batches employed which causes considerable damage within the furnace to refractory linings necessitating costly and frequent shutdowns for replacement or repair of these linings. Still further, considerable quantities of glass often are rejected because of the existence therein of blisters caused by trapped gases in the melted batches. Also quite frequently, seeds or unmelted sand particles in the glass products occur which also necessitates the rejection of product.

It has been proposed in U.S. patent application Serial No. 812,459 of Robert W. Hopkins, filed May 11, 1959, that in preparing batches of glass making ingredients, the above enumerated disadvantages may be eliminated or greatly minimized by adding at least a portion of the alkali requirement of the glass batch ingredients as a solution. Preferably, the addition of the alkali content of the glass batch ingredients is so conducted that a portion of it is added as an aqueous alkali solution. The addition of a portion of the alkali content of the glass batch as an aqueous solution apparently produces a coating effect on the sand particles present in the batch. This coating or encasement of the sand content of the batch ingredients, it is believed, provides more intimate contact and greater heat transfer efficiency between the alkali and the sand present to assist in the melting operation. The intimate contact of sand particles and the alkali solution results in the formation of agglomerates which are less susceptible to dusting than individual sand or alkali particles normally encountered in standard mixed glass batches. In addition, the mixing of a portion of the alkali content of the glass batch as an aqueous solution with the batch sand provides individual sand particles in the mixed batch which are completely coated with the alkali solution and results in the production of wet, homogeneous, free flowing mixture of batch ingredients.

When the wet, homogeneous, free flowing mixture produced by alkali liquor additions to glass batch ingredients are employed as furnace feed material, dusting in the mixing and conveying operations, as well as the furnace melting operations and carry-over problems formerly encountered are substantially eliminated. The frequency of the production of inferior glass containing blisters and/or seeds is substantially reduced. The melting time for any specific batch of glass making ingredients in a furnace is substantially reduced thereby providing increased furnace capacity. Refractory linings of glass melting furnaces are maintained in operational condition for considerably longer periods of time when glass batches prepared in accordance with this process are employed. In addition, uniform batches are easily produced for feeding to furnaces.

Many of the problems associated with mixing and handling of glass batch ingredients may be eliminated by the addition to the glass batch ingredients of quantities of water. However, because water in the glass batch can cause it to set up, water addition provides overriding complications. Thus, the amount of water has usually been limited to below 2 to 3 percent by weight of the batch. Additions of water in excess of the 3 percent quantity nevertheless provide benefits with respect to the melting characteristics of the batch ingredients. For example, glass batches containing between 5 and 20 percent water by weight of the batch result in the production of glass batches which exhibit much faster melting rates than those employing quantities of water in the 3 percent range or below. The addition of water in quantities ranging between 5 and 20 percent by weight of the glass batch results in the production of wet, homogeneous, free flowing mixtures of batch ingredients. Mixtures of this type fed to glass forming furnaces exhibit extremely rapid melting rates and dusting during the mixing and conveying operations is reduced to a minimum.

While both the above described processes involving the feeding of wet, homogeneous, free flowing mixtures of batch ingredients to glass forming furnaces are beneficial, some difficulty is encountered when the wet batch ingredients are permitted to stand for any appreciable length of time, for example, 15 minutes to an hour or longer. It is found that upon standing, the wet batch mixtures tend to set up or harden into solid masses which are broken up only with considerable difficulty. This tendency to harden or set up is especially acute when the wet batch ingredients have been prepared utilizing alkali solution additions to the batch ingredients representing alkali contents of over 15 percent by weight of the total alkali content of the batch. Solution additions representing this quantity of the alkali content of the batch set up rapidly and the set up masses are extremely difficult to break up. In addition, water additions to dry glass batch ingredients in quantities in the range of 5 to 20 percent by weight also exhibit this setting-up characteristic. Water additions representing between 5 to 20 percent by weight of the batch set up rapidly into solid masses which present particularly bothersome problems since they have to be broken up before being fed to the furnace.

It has been found, in accordance with this invention, that hardening or setting up of wet batch mixtures produced by the addition and mixing of alkali solutions with glass batch ingredients or by the additions of water to glass batch ingredients in quantities ranging between 5 and 20 percent by weight may be eliminated by controlling the temperature of the glass batch ingredients during the mixing and in subsequent operations such as conveying. Also, storage of the wet batches under controlled temperature conditions will prevent the setting-up or hardening of the mixtures from occurring. It has also been found that wet batches which have set up may be made free flowing by raising the temperature of the hardened mass. Thus, by regulating the temperature of wet batch mixtures to above 90° F., preferably above 100° F., the batch mixtures are maintained in a wet, free flowing condition. In addition, a wet, homogeneous, free flowing mixture of batch ingredients which has hardened or set up to form a solid mass upon standing may be restored to its wet, homogeneous, free flowing state by heating the solid mass to a temperature above 90° F., preferably above 100° F. The temperature of the batch ingredients is generally maintained under atmospheric conditions between 90° F. and 200° F.

Control of the temperature of the mixtures produced, as hereinabove described, may be accomplished in many ways. Thus, alkali solution and/or water additions may be made with solutions at relatively high temperatures, for example over 120° F., in order to introduce heat into the mixture being formed. External heating sources may be applied to storage bins where the wet mixtures produced are stored for use. In addition, the batch ingredients may be heated prior to mixing to insure the production of mixtures at temperatures above 90° F. In some instances, the wet mixtures are conveniently stored in an area having a sufficiently high temperature to provide the required temperature for the mixtures.

The aqueous solutions of alkali added to glass making ingredients are prepared in conventional digesting equipment. The amount of alkali added to the batch in aqueous form will determine the quantity of water and temperatures employed in solubilizing the alkali. While the quantity of alkali added to a particular batch may be subject to considerable variation, it is found advantageous to employ quantities in a range of between 5 and 40 percent basis the total weight content of the alkali in the batch, preferably between 10 and 25 percent by weight. Quantities of alkali below the 5 percent preferred range, while beneficial in achieving some advantages, are not quite as effective as additions conducted in the preferred ranges. The alkali solutions are saturated with respect to alkali and may range from between 5 and 45 percent by weight of the solution in concentration depending on the temperature of the solvent.

The alkali employed in the glass making mixtures are generally alkali metal salts, such as soda ash, sodium sulfate, potassium carbonate, sodium bicarbonate, sodium sesquicarbonate and the like. Sodium salts are most commonly employed with soda ash forming the preferred alkali metal salt. The alkali may, of course, also be present as a mixture of alkali metal salts. The water content of the batches prepared when the alkali is added to the batch making ingredients as an aqueous alkali solution ranges between 2 to 20 percent by weight of the batch. When water is employed as water and added to the glass batch ingredients, the water content ranges between 5 and 20 percent by weight of the batch preferably 10 to 15 percent by weight.

The alkali liquor addition to the batch ingredients may be accomplished in various ways. In one preferred mode of operation, for example, the alkali solution is added to the sand content of the batch and mixed therewith. After the mixing has been completed, the remainder of the alkali content is added in dry form and thoroughly mixed. The remainder of the batch ingredients are then added and mixed with the alkali-sand mixture and the batch is then ready for removal to a furnace or storage bin. While the alkali solution is preferably added to the sand prior to the addition of the remaining batch ingredients, the alkali solution addition may be conducted in other sequences if desired. Thus, for example, the sand content of a batch may be mixed in a dry condition with a portion of the alkali required in the batch. After thorough mixing of the dry sand and dry alkali, an alkali solution representing the balance of the alkali requirement of the finished batch may be added. Similarly, the sand content of the batch may be mixed with coloring ingredients utilized in the production of a particular glass along with a portion of the alkali content of the batch, and after thorough mixing, a subsequent addition of the remaining alkali requirement of the finished batch may be added as an aqueous solution.

Water additions to glass batch ingredients are accomplished easily and may be conveniently accomplished by simply adding the necessary weight quantity of water to the ingredients as they are introduced into the mixing devices employed. Thus, the glass batch ingredients are added to the mixing machine and to these ingredients are added between 5 and 20 percent by weight of water. It is, of course, possible to add the water to the mixing equipment and add the batch ingredients thereto. Addition of water to the batch ingredients preferably takes place in the mixing devices to insure uniformed dispersion of the particles throughout the water. As in the case of alkali liquor additions, it is believed the additions of water in the quantities hereinabove set forth produces aqueous alkali solutions in situ which, in turn, coat or encase the sand particles contained in the batch making ingredients, thus greatly facilitating the transfer of heat to the sand particles.

The time required for mixing batch ingredients in accordance with the instant invention is, of course, subject to considerable variation depending upon the nature of the batch itself, the quantity of the alkali added as an aqueous solution or the quantity of water added as water and other similar considerations. In general, the dry ingredients to which the aqueous alkali solution is added or to which water is added are mixed thoroughly in mechanical devices such as pug mills, rotary mills, tumblers, mix mullers and other like devices. The important consideration is the obtention of the maximum dispersion of particles uniformly throughout the batch.

As a further refinement in obtaining a maximum wetting of the sand particles contacted with the aqueous solutions of the alkali metal salt employed or the water added to the glass batch making ingredients wetting agents may be employed in connection with the mixing operation. Thus, if desired, wetting agents may be added to the soda ash solution contacted with the sand particles to thereby thoroughly wet these particles with the soda ash solution contacted therewith. In a similar manner, wetting agents may be added to the water contacted with the glass batch making ingredients to thereby thoroughly wet the ingredients with the water contacted therewith. Any conventional wetting agent may be employed such as an alkyl aryl sulphonate. Utilization of wetting agents in the alkali metal aqueous solutions or the water contacted with the sand particles or glass batch making ingredients in accordance with this invention has a beneficial effect in providing a uniformed coating of the sand particles with the aqueous alkali solutions employed or the solutions formed in situ when water is added as water.

In one embodiment of the mixing procedures which produce wet, homogeneous, free flowing mixtures of glass batch ingredients to be utilized as such in a glass forming furnace for the production of glass, the following steps are conveniently employed. The sand content of the batch is weighed out and placed in a mixing device such as a mix muller. Fifteen percent of the soda ash requirement of the batch being prepared is weighed out and conveyed to a digesting tank. To the soda ash in the digester is added sufficient water at 100° F. to form a saturated solution of soda ash. After the soda ash solution has been prepared, it is added in its entirety to the sand in the mix muller and the muller is actuated and the sand and solution thoroughly mixed. After thorough mixing, the remainder of the soda ash content of the batch is weighed out and added to the sand-soda ash liquor mixture with continuous mixing. When the remainder of the soda ash has been thoroughly mixed with the sand-soda ash liquid mixture, the remaining batch ingredients are added to the mix muller and mixed therewith. The resulting mixture of batch ingredients is homogeneous in appearance, wet to the touch and is free flowing.

In another embodiment of the mixing procedures employed to produce a wet, homogeneous, free flowing mixture of glass batch ingredients to be utilized as such in a glass forming furnace for the production of glass, the following steps may be employed. The sand, alkali and other ingredients contained in the desired glass batch are weighed out and placed in a mixing device such as a mix muller. The mix muller is actuated and the ingredients thoroughly mixed while dry. To the glass making ingredients contained in the mix muller, there is added 15 percent by weight of water thereto at a temperature of approximately 100° F. The mix muller is again actuated and the water and dry glass making ingredients contained in the muller completely mixed. The resulting mixture of batch ingredients is homogeneous in appearance, wet to the touch and is free flowing.

Glass making ingredients mixed in the above described manner are found to be extremely desirable in glass melting characteristics exhibiting fast melting times with little or no dusting either internal or external during the melting operation. The glass making mixtures prepared as indicated above do harden and set up upon prolonged standing and the method of preventing and/or rectifying this condition will be readily understood from the following illustrative examples.

*Example I*

A soda-lime glass batch is prepared from the following ingredients:

| | Grams |
|---|---|
| Sand | 200 |
| Limestone | 50 |
| Soda ash | 70 |

Fourteen (14) grams of soda ash are dissolved in 36 grams of water at a temperature of 100° F. to produce a 35 percent (by weight) soda ash solution. The 200 grams of sand are placed in a glass jar and the entire 35 percent soda ash solution is added and thoroughly mixed with the sand by hand tumbling the jar. The remaining dry soda ash (56 grams) and the limestone (50 grams) are then added to the jar, the jar is covered, and the contents are tumbled until a thorough mixing of ingredients is obtained. The water content of the mixture is 10 percent by weight. The mixture is then permitted to stand in an open jar for a period of 24 hours at ambient temperatures (77° F.). The mixture at the end of this period is found to be an apparently dry, solid mass of material. The jar containing the solid mass is placed on a hot plate and subjected to heating to a temperature of 110° F. The solid mass upon attaining this 110° F. temperature is converted to a wet, homogeneous, free flowing mixture. Twenty (20) grams of the wet mixture is placed in a ceramic crucible. The crucible is placed in an electric muffle furnace operated at 2600° F. for 30 minutes. The crucible is removed from the furnace, cooled, and a batch free (no unmelted particles) soda lime glass is obtained.

*Example II*

A soda-lime glass batch is prepared from the following ingredients:

| | Grams |
|---|---|
| Sand | 200 |
| Limestone | 50 |
| Soda ash | 70 |

Fourteen (14) grams of soda ash are dissolved in 36 grams of water at a temperature of 100° F. to produce a 35 percent (by weight) soda ash solution. The 200 grams of sand are placed in a glass jar and the entire 35 percent soda ash solution is added to the jar, the jar is covered and the solution thoroughly mixed with the sand by hand tumbling the jar. The remaining dry soda ash (56 grams) and the limestone (50 grams) are then added to the jar, the jar is again covered and the contents are tumbled until a thorough mixing of the ingredients is obtained. The jar containing the wet, free flowing, homogeneous batch ingredients is then placed on a hot plate and the temperature of the ingredients maintained at 100° F. for a period of 48 hours. No hardening of the mixture occurs and at the end of this period the mixture is still wet, homogeneous and free flowing. Twenty (20) grams of the wet mixture is placed in a ceramic crucible. The crucible is placed in an electric muffle furnace operated at 2600° F. for 30 minutes. The crucible is removed from the furnace, cooled and a batch free (no unmelted particles) soda-lime glass is obtained.

*Example III*

A soda-lime glass batch is prepared from the following ingredients:

| | Grams |
|---|---|
| Sand | 200 |
| Limestone | 50 |
| Soda ash | 70 |

Two hundred (200) grams of sand, the fifty (50) grams of limestone and the seventy (70) grams of soda ash are placed in a glass jar and the contents thoroughly mixed by covering and hand tumbling the jar. To the contents of the jar after this mixing step are added forty-eight (48) grams of tap water. The jar is again covered and the contents are tumbled until a thorough mixing of the ingredients is obtained. The water content of the mixture is 15 percent by weight. The mixture is then permitted to stand in an open jar for a period of 24 hours at ambient temperature (77° F.). The mixture at the end of this period is found to be an apparently dry solid mass of material. The jar containing the solid mass is placed on a hot plate and subjected to heating at a temperature of 110° F. The solid mass upon attaining this 110° F. is converted to a wet, homogeneous, free flowing mixture. Twenty grams of the wet mixture is placed in a ceramic crucible. The crucible is placed in an electric muffle furnace operated at 2600° F. for 30 minutes. The crucible is removed from the furnace, cooled and a batch free soda-lime glass is obtained.

*Example IV*

A soda-lime glass batch is obtained from the following ingredients:

| | Grams |
|---|---|
| Sand | 200 |
| Limestone | 50 |
| Soda ash | 70 |

Two hundred (200) grams of sand, the fifty (50) grams of limestone and the seventy (70) grams of soda ash are placed in a glass jar, the jar covered and the contents thoroughly mixed by hand tumbling the jar. After thorough mixing, forty-eight (48) grams of tap water at a temperature of 100° F. is added to the jar. The jar is again covered and the contents are tumbled until a thorough mixing of the ingredients is obtained. The jar containing the wet, homogeneous, free flowing mixture of glass batch ingredients is then placed on a hot plate and the temperature of the ingredients maintained at 100° F. for a period of forty-eight (48) hours. No hardening of the mixture occurs and at the end of this period the mixture is still a wet, homogeneous, free flowing mixture. Twenty (20) grams of the wet mixture is placed in a ceramic crucible. The crucible is placed in an electric muffle furnace operated at 2600° F. for 30 minutes. The crucible is removed from the furnace, cooled and a batch free soda-lime is obtained.

As can be readily seen from the above examples, controlling the temperature of the wet, free flowing, homogeneous batch mixtures prepared by alkali solution additions to batch ingredients or by the addition of water to dry batch ingredients in amounts ranging between 5 and 20 percent by weight of the batch provides wet, free flowing, homogeneous mixtures for prolonged periods. In addition, hardened batches are conveniently returned to a free flowing state applying the principles hereinabove set forth.

While the present invention has been described with reference to certain specific examples, it is not intended that the invention be so limited except insofar as it appears in the accompanying claims.

This application is a continuation in part of co-pending application U.S. Serial No. 812,118, filed May 11, 1959, and now abandoned.

I claim:

1. A method of preparing glass by forming and heating a mixture of glass making ingredients comprising sand and soda ash which comprises mixing an aqueous solution of a portion of the soda ash content of the ingredients with the sand to form a wet, free flowing mixture, permitting the mixture to stand for a period of time sufficient to convert the mixture to a solid mass by setting up the batch ingredients, heating the mass to a temperature between 90° and 200° F. to convert the mass to a wet, free flowing mixture and to prevent it from setting up and feeding the mixture so formed while wet to a glass forming furnace.

2. In a method of preparing glass by forming and heating a mixture of glass making ingredients comprising sand and alkali metal salts, which comprises tumbling a plastic mixture of an aqueous solution of said salts and sand, the amount of water present being enough to produce a wet mixture thereby forming agglomerates, and feeding the resulting agglomerates into a glass forming furnace, the improvement comprising maintaining the temperature of said wet mixture between 90° F. and 200° F. to prevent setting up of the said mixture and to maintain said mixture in a wet state and feeding said mixture while in a wet state to a glass forming furnace.

3. In a method of preparing glass by forming and heating a mixture of glass making ingredients comprising sand and alkali metal carbonate, which comprises tumbling a plastic mixture of an aqueous solution of said carbonate and sand, the amount of water present being enough to produce a wet mixture and thereby forming agglomerates, and feeding the resulting agglomerates into a glass forming furnace, the improvement comprising maintaining the temperature of said wet mixture between 90° F. and 200° F. to thereby prevent setting up of said mixture and to maintain said mixture in a wet state and feeding said mixture while in said wet state to a glass forming furnace.

4. In a method of preparing glass by forming and heating a mixture of glass making ingredients comprising sand and soda ash, which comprises mixing an aqueous solution of a portion of the soda ash content of the ingredients with the sand to form a wet, free-flowing mixture and feeding the free-flowing mixture so formed, while wet to a glass forming furnace, the improvement comprising maintaining the temperature of the wet mixture between 90° F. and 200° F. to thereby maintain said mixture in a wet state and to prevent setting of the batch ingredients and feeding said mixture while wet to a glass forming furnace.

5. In a method of preparing glass by forming and heating a mixture of glass making ingredients comprising sand and soda ash, which comprises mixing an aqueous solution of a portion of the soda ash content of the ingredients with the sand to form a wet, free-flowing mixture, said aqueous solution containing between 5 and 40 percent of the soda ash content of the ingredients, and feeding the free-flowing mixture so formed, while wet to a glass forming furnace, the improvement comprising maintaining the temperature of said wet mixture between 90° F. and 200° F. to thereby maintain said mixture in a wet, free-flowing state, and to prevent setting up of said mixture.

6. In a method of preparing glass by forming and heating a mixture of glass making ingredients comprising sand and soda ash, which comprises mixing an aqueous solution of a portion of the soda ash content of the ingredients with the sand to form a wet, free-flowing mixture, said aqueous solution containing between 5 and 15 percent by weight of the soda ash requirement of the ingredients, and feeding the wet, free-flowing mixture so formed while wet to a glass forming furnace, the improvement comprising maintaining the temperature of the wet mixture between 90° F. and 200° F. to thereby maintain said mixture in a wet, free-flowing state and to effectively prevent setting up of said mixture.

7. In a method of preparing glass by forming and heating a mixture of glass making ingredients comprising sand and alkali metal salts, which comprises tumbling a plastic mixture of said salts and sand with water, said water being present in amounts ranging between 5 and 20 percent by weight of the glass making ingredients and thereby forming wet, free-flowing agglomerates and feeding the resulting wet, free-flowing agglomerates while wet into a glass forming furnace, the improvement comprising maintaining the temperature of the wet mixture between 90° F. and 200° F. to thereby maintain said mixture in a wet condition and to prevent setting up of said mixture.

8. In a method of preparing glass by forming and heating a mixture of glass making ingredients comprising sand and alkali metal carbonate, which comprises tumbling a plastic mixture of said carbonate and sand with water, said water being present in amounts ranging between 5 and 20 percent by weight of the glass making ingredients to produce a wet mixture and thereby forming wet, free-flowing agglomerates, and feeding the said wet, free-flowing agglomerates while wet into a glass forming furnace, the improvement comprising maintaining the temperature of the wet mixture between 90° F. and 200° F. to thereby maintain said mixture wet and to prevent setting up of said mixture.

9. In a method of preparing glass by forming and heating a mixture of glass making ingredients comprising sand and alkali metal salts, which comprises mixing said sand and salts with water, said water being present in amounts ranging between 5 and 20 percent by weight of the batch ingredients to thereby form a wet, free-flowing mixture and feeding the wet, free-flowing mixture so formed while wet to a glass forming furnace, the improvement comprising maintaining the temperature of the mixture between 90° F. and 200° F. to thereby maintain said mixture in a wet condition and to prevent setting up of said wet mixture.

10. In a method of preparing glass by forming and heating a mixture of glass making ingredients comprising sand and alkali metal carbonate, which comprises mixing said alkali metal carbonate and sand with water, said water being present in amounts ranging between 5 and 20 percent by weight of the batch ingredients to thereby form a wet, free-flowing mixture and feeding the wet, free-flowing mixture so formed while wet to a glass forming furnace, the improvement comprising maintaining the temperature of the wet mixture between 90° F. and 200° F. to thereby maintain said mixture in a wet condition and to prevent setting up of said mixture.

11. In a method of preparing glass by forming and heating a mixture of glass making ingredients comprising sand and soda ash, which comprises mixing said sand and soda ash with water, said water being present in amounts ranging between 5 and 20 percent by weight of the ingredients, to thereby form a wet, free-flowing mixture and feeding the wet, free-flowing mixture so formed while wet to a glass forming furnace, the improvement comprising maintaining the temperature of said wet mixture between 90° F. and 200° F. to thereby maintain said mixture in a wet condition and to prevent setting up of said mixture.

12. In a method of preparing glass by forming and heating a mixture of glass making ingredients comprising sand and soda ash, which comprises mixing said sand and soda ash with water, said water being present in amounts ranging between 5 and 20 percent by weight of the glass making ingredients, to thereby form a wet, free-flowing mixture, permitting the mixture to stand for a period of time sufficient to set up the mixture and form a dry, solid mass, heating the dry, solid mass to a temperature between 90° F. and 200° F. to convert said solid mass to a wet, free-flowing mixture and to prevent said mixture from setting up, and feeding the mixture while wet to a glass forming furnace.

References Cited in the file of this patent

UNITED STATES PATENTS

| | | |
|---|---|---|
| 2,191,658 | Haux | Feb. 27, 1940 |
| 2,366,473 | Bair | Jan. 2, 1945 |
| 2,813,036 | Poole | Nov. 12, 1957 |